(12) United States Patent
Rogers et al.

(10) Patent No.: US 7,452,389 B2
(45) Date of Patent: *Nov. 18, 2008

(54) CARBON FOAM ABRASIVES

(75) Inventors: Darren Kenneth Rogers, Wheeling, WV (US); Janusz Wladyslaw Plucinski, Glen Dale, WV (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 420 days.

This patent is subject to a terminal disclaimer.

(21) Appl. No.: 10/810,845

(22) Filed: Mar. 29, 2004

(65) Prior Publication Data

US 2004/0177564 A1  Sep. 16, 2004

Related U.S. Application Data

(63) Continuation of application No. 09/976,425, filed on Oct. 12, 2001, now Pat. No. 6,860,910.

(51) Int. Cl.
*C10L 5/00* (2006.01)

(52) U.S. Cl. .............................. 44/620; 156/78; 423/76; 423/448; 423/460; 428/408; 428/489

(58) Field of Classification Search .................... 44/620; 156/78; 423/76, 448, 460; 428/408, 489
See application file for complete search history.

(56) References Cited

U.S. PATENT DOCUMENTS 3,003,860 A * 10/1961 Sermon et al. ................ 51/307
3,024,130 A * 3/1962 Kish ........................... 428/416
3,309,437 A    3/1967 Harnett ....................... 423/460
3,345,440 A   10/1967 Googin
6,689,470 B1  2/2004 Joseph
6,869,455 B2 * 3/2005 Rogers et al. ................. 44/620
2004/0177550 A1 9/2004 Rogers

FOREIGN PATENT DOCUMENTS

GB       14899690      10/1977

OTHER PUBLICATIONS

ULTRAFOAMc:www.ultramet.com/8.htm—Dec. 7, 1998.*
Kirk-Othmer, Encyclopedia of Chemical Technology, 4th Edition, vol. 6, John Wiley & Sons, NY., Application of Coal Petrology & Petrography, pp. 429-434 & 454-455, 1993.
SU 973,509A, English Abstract, (BELIO), Nov. 1982.
SU 536,148A, English Abstract, (DEMII), Jan. 1977.
JP 53-094,313A, English Abstract, (IBIG), Aug. 1978.
CN 1290755A, English Abstract, (YELLI), Apr. 2001.
Kuzurman, et al., Foam Materials Based on Silicon and Titanium Carbides, 1993, Powder Metallurgy and Metal Ceramics, vol. 32, Nos. 9-10.
ULTRAFOAM "Open-Cell Silicon Carbide Foam" data, Ultramet, Feb. 14, 1998.

* cited by examiner

*Primary Examiner*—Cephia D Toomer
(74) *Attorney, Agent, or Firm*—Philip D. Lane

(57) ABSTRACT

The incorporation or blending of from about 1 to about 10% by volume of a "carbide precursor" powder, preferably on the order of <100 microns in size, with a coal particulate starting material and the subsequent production of carbon foam in accordance with the method described herein, results in a carbon foam that exhibits significantly enhanced abrasive characteristics typical of those required in the polishing of, for example glass, in the manufacture of cathode ray tubes.

1 Claim, 1 Drawing Sheet

CARBON FOAM ABRASIVES

The present application is a continuation of and claims, under 35 U.S.C. § 120, the benefit of U.S. patent application Ser. No. 09/976,425, filed Oct. 12, 2001 now U.S. Pat. No. 6,860,910, which is expressly incorporated fully herein by reference.

FIELD OF THE INVENTION

The present invention relates to carbon foam materials and more particularly to coal-based carbon foams that include reaction bonded abrasive materials.

BACKGROUND OF THE INVENTION

There exists a continuing need for improved and enhanced abrasive materials that exhibit high strength and excellent abrasion properties for application in such areas as the polishing of glass for use in cathode ray tubes and the like.

U.S. patent application Ser. No. 09/453,729 filed Dec. 2, 1999 and entitled, "Coal-Based Carbon Foams describes a family of high strength, carbon foams having a density of preferably between about 0.1 g/cm$^3$ and about 0.8 g/cm$^3$ produced by the controlled heating of coal particulate preferably under a non-oxidizing atmosphere. The coal-based carbon foams produced in accordance with the method described in this application can be carbonized and graphitized to yield very strong carbon foams that are extremely resistant to oxidation and ablation.

The carbon foams described in this application, exhibit compressive strengths up to about 6000 psi and untreated demonstrate significant abrasive properties.

OBJECT OF THE INVENTION

It is an object of the present invention to improve the abrasive properties of the carbon foam materials of the aforementioned U.S. patent application Ser. No. 09/453,729 without adversely affecting any of their other, particularly their strengths.

SUMMARY OF THE INVENTION

It has now been discovered that the incorporation of from about 1 to about 10 volume percent of a carbide precursor such as titanium, silicon, tungsten etc. in a finely powdered form into the initial coal powder starting material described in aforementioned application results in the formation of the carbides of these materials upon foaming, carbonization and graphitization. Such carbides are of course well known abrasives and their incorporation into the already high strength, oxidation resistant and inherently ablation resistant carbon foams previously described results in significantly improved abrasive materials.

DETAILED DESCRIPTION

Figure 1:
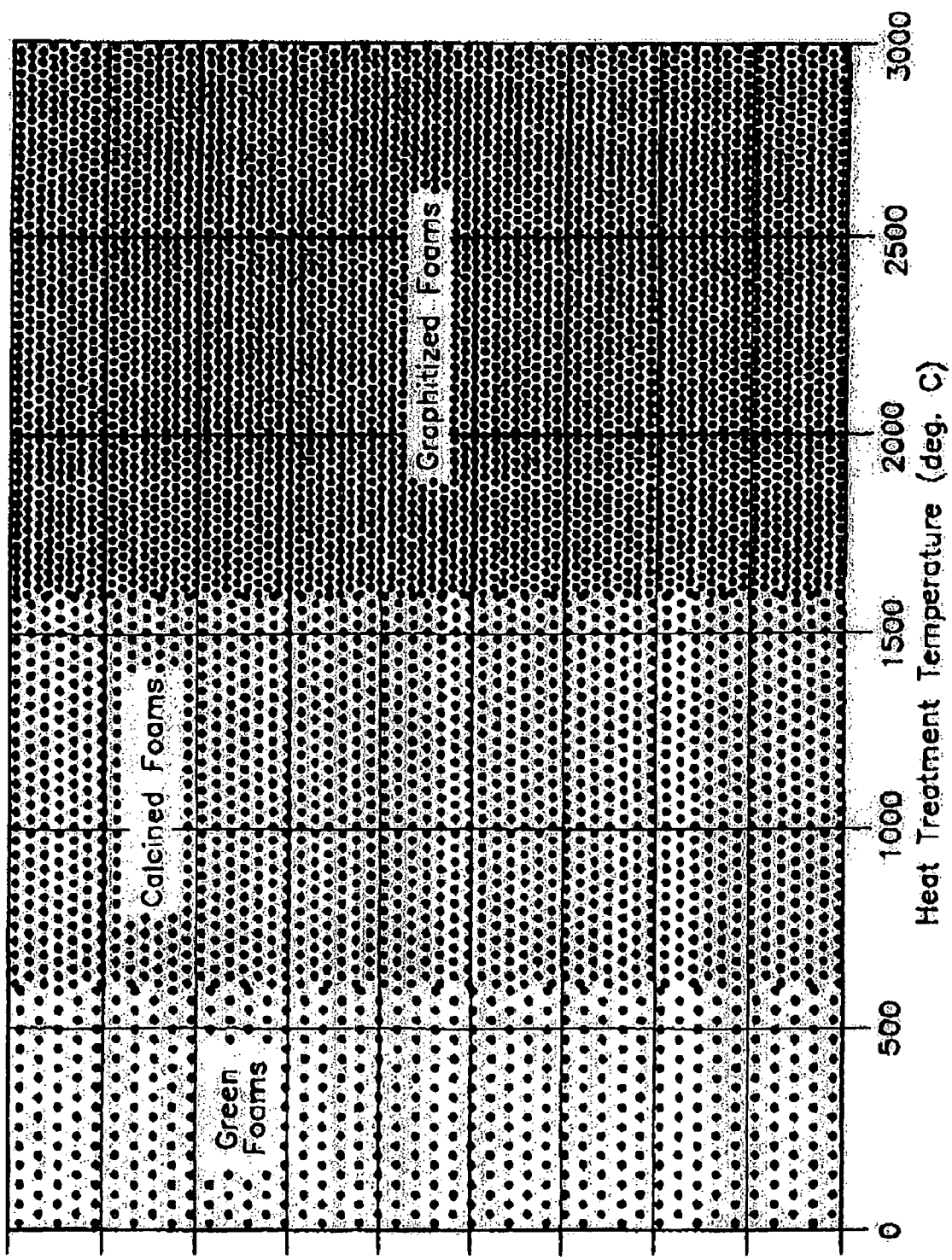
FIG. 1 is a graph showing the heat treatment temperatures for the various phases of the production process used in the fabrication of the abrasive carbon foam of the present invention.

U.S. patent application Ser. No. 09/453,729 filed Dec. 2, 1999 and entitled, "Coal-Based Carbon Foams", which is incorporated herein by reference in its entirety, describes a family of high strength, carbon foams having a density of preferably between about 0.1 g/cm$^3$ and about 0.8 g/cm$^3$ produced by the controlled heating of coal particulate preferably under a non-oxidizing atmosphere. The coal-based, carbon foams produced in accordance with the method described in this application are carbonized and graphitized to yield very strong carbon foams that are extremely resistant to oxidation and ablation in their own right, but even more so when produced in accordance with the method described herein.

The process described in this application comprises: 1) heating a coal particulate of preferably small i.e., less than about ¼ inch particle size in a "mold" and under a non-oxidizing atmosphere at a heat up rate of from about 1 to about 20° C. to a temperature of between about 300 and about 700° C.; 2) soaking at a temperature of between about 300 and 700° C. for from about 10 minutes up to about 12 hours to form a green foam; and 3) controllably cooling the green foam to a temperature below about 100° C. According to the method described in the aforementioned application, the green foam is subsequently preferably carbonized by the application of known techniques, for example, soaking at a temperature of between about 800° C. and about 1200° C. for a period of from about 1 to about 3 hours. Although this is the preferred temperature range for carbonization, carbonization can actually occur at temperatures between about 600° C. and 1600° C. Graphitization, commonly involves heating the green foam either before or after carbonization at a heat-up rate of less than about 10° C. per minute, preferably from about 1° C. to about 5° C. per minute, to a temperature of between about 1700° C. and about 3000° C. in an atmosphere of helium or argon and soaking for a period of less than about one hour. Again, the inert gas may be supplied at a pressure ranging from about 0 psi up to a few atmospheres.

The temperature ranges for the various thermal treatments of the materials described in the aforementioned patent application and in this application are shown graphically in FIG. 1. The foams thus produced exhibit a significant resistance to oxidation and ablation and can serve as abrasives in their own right.

It has now been discovered that the incorporation or blending of from about 1 to about 10% by volume of a "carbide precursor" powder, preferably on the order of <100 microns in size, with the coal particulate starting material and the subsequent production of carbon foam in accordance with the method described herein, results in a carbon foam that exhibits significantly enhanced abrasive characteristics typical of those required in the polishing of, for example glass, in the manufacture of cathode ray tubes.

"Carbide precursors" of the type useful in accordance with the present invention include but are not limited to such materials as silicon that forms silicon carbide, tungsten that forms tungsten carbide and titanium that forms titanium carbide during calcination and graphitization as described herein. However, any material capable of reacting with carbon during the calcination and graphitization operations as described herein to form an abrasive carbide that is "reaction bonded" to the carbon foam skeleton are suitable candidates for application in the abrasive carbon foams described herein. "Reaction bonded" carbides comprise those carbides that are reactively bonded to the foam structure or skeleton during the foam, calcination and graphitization processes, as opposed to similar carbide materials that might simply be added as a blend with the starting material coal and remain in their unreacted state as "free" carbides (i.e. unbonded) in the final carbon foam product.

The method of producing the abrasive carbon foams of the present invention comprises initially: 1) heating a coal particulate of preferably small, i.e. less than about ¼ inch particle size, blended with from about 1 to about 10 volume percent of a "carbide precursor" powder in a "mold" and under an inert or non-oxidizing atmosphere at a heat up rate of from about 1 to about 20° C. to a temperature of between about 300 and about 600° C.; 2) soaking at a temperature of between about 300 and 600° C. for from about 10 minutes up to about 12 hours to form a "green foam"; 3) controllably cooling the "green foam" to a temperature below about 100° C.; carbonizing the green foam in an inert or non-oxidizing atmosphere to produce a carbonized foam; and graphitizing. The inert or non-oxidizing atmosphere may be provided by the introduction of inert or non-oxidizing gas into the "mold" at a pressure of from about 0 psi, i.e., free flowing gas, up to about 500 psi. The inert gas used may be any of the commonly used inert or non-oxidizing gases such as nitrogen, helium, argon, $CO_2$, etc.

It is generally not desirable that the reaction chamber be vented or leak during this heating and soaking operation. The pressure of the chamber and the increasing volatile content therein tends to retard further volatilization while the cellular product sinters at the indicated elevated temperatures. If the furnace chamber is vented or leaks during soaking, an insufficient amount of volatile matter may be present to permit inter-particle sintering of the coal particles thus resulting in the formation of a sintered powder as opposed to the desired cellular product. Thus, according to a preferred embodiment of the present process, venting or leakage of non-oxidizing gas and generated volatiles is inhibited consistent with the production of an acceptable cellular product.

Additional more conventional blowing agents may be added to the particulate prior to expansion to enhance or otherwise modify the pore-forming operation.

The term "mold", as used herein is meant to define any mechanism for providing controlled dimensional forming of the expanding coal or carbon or containing the foaming operation. Thus, any chamber into which the coal particulate and carbide precursor blend is deposited prior to or during heating and which, upon the foam precursor attaining the appropriate expansion temperature, contains the expanding carbon to some predetermined configuration such as: a flat sheet; a curved sheet; a shaped object; a building block; a rod; tube or any other desired solid shape can be considered a "mold" or purposes of the instant invention. The term "mold" as used herein, is also meant to include any container, even an open topped container that "contains" the expanding mixture so long as such a device is contained in a pressurizable vessel that will permit controlled foaming as described herein. Clearly, a container that results in the production of some particular near net or net shape is particularly preferred.

As will be apparent to the skilled artisan familiar with pressurized gas release reactions, as the pressure in the reaction vessel, in this case the mold increases, from 0 psi to 500 psi, as imposed by the inert or non-oxidizing gas, the reaction time will increase and the density of the produced porous coal will increase as the size of the "bubbles" or pores produced in the expanded carbon decreases. Similarly, a low soak temperature at, for example, about 400° C. will result in a larger pore or bubble size and consequently a less dense expanded coal than would be achieved with a soak temperature of about 600° C. Further, the heat-up rate will also affect pore size, a faster heat-up rate resulting in a smaller pore size and consequently a denser expanded coal product than a slow heat-up rate. These phenomenon are, of course, due to the kinetics of the volatile release reactions which are affected, as just described, by the ambient pressure and temperature and the rate at which that temperature is achieved. These process variables can be used to custom produce the expanded coals of the present invention in a wide variety of controlled densities, strengths etc.

Cooling of the "green foam" after soaking is not particularly critical except as it may result in cracking of thereof as the result of the development of undesirable thermal stresses. Cooling rates less than 10° C./min to a temperature of about 100° C. are typically used to prevent cracking due to thermal shock. Somewhat higher, but carefully controlled, cooling rates may however, be used to obtain a "sealed skin" on the open cell structure of the product as described below. The rate of cooling below 100° C. is no way critical.

After expanding the carbon material as just described, the "green foam" is an open celled material. Several techniques have been developed for "sealing" the surface of the open celled structure to improve its adhesive capabilities for further fabrication and assembly of a number of parts. For example, a layer of a commercially available graphitic adhesive (for example an epoxy-graphite adhesive) can be coated onto the surface and cured at elevated temperature or allowed to cure at room temperature to provide an adherent skin. Alternatively, the expansion operation can be modified by cooling the "green foam" rapidly, e.g., at a rate of 10° C./min or faster after expansion. It has been discovered that this process modification results in the formation of a more dense skin on the "green foam" which presents a closed pore surface to the outside of thereof. At these cooling rates, care must be exercised to avoid cracking.

After expanding, the "green foam" is readily machineable, sawable and otherwise readily fabricated using conventional fabrication techniques.

A variety of additives and structural reinforcers may be added to the carbon materials of the present invention either before or after expansion to enhance specific mechanical properties such as a fracture strain, fracture toughness and impact resistance. For example, particles, whiskers, fibers, plates, etc. of appropriate carbonaceous or ceramic composition can be incorporated into the abrasive foam to enhance its mechanical properties.

The abrasive foams of the present invention can additionally be impregnated with; for example, petroleum pitch, epoxy resins or other polymers using a vacuum assisted resin transfer type of process. The incorporation of such additive provides load transfer advantages similar to those demonstrated in carbon composite materials. In effect a 3-D composite is produced that demonstrates enhanced impact resistance and load transfer properties.

The cooling step in the expansion process results in some relatively minimal shrinkage on the order of less than about 5% and generally in the range of from about 2% to about 3%. This shrinkage must be accounted for in the production of near net shape or final products of specific dimensions and is readily determinable through trial and error with the particular carbon starting material being used. The shrinkage may be further minimized by the addition of some inert solid material such as coke particles, ceramic particles, ground waste from the coal expansion process etc. as is common practice in ceramic fabrication.

According to the method of the present invention, subsequent to the production of the "green foam" as just described, the "green foam" is subjected to carbonization and graphitization within the controlled conditions described below to obtain the abrasive foam of the present invention.

Carbonization, sometimes referred to as calcining is conventionally performed by heating the green foam under an appropriate inert gas at a heat-up rate of less than about 5° C. per minute to a temperature of between about 600° C. and about 1600° C. and preferably between about 800° C. and about 1200° C. and soaking for from about 1 hour to about three or more hours. Appropriate inert gases are those described above that are tolerant of these high temperatures. The inert atmosphere is supplied at a pressure of from about 0 psi up to a few atmospheres. The carbonization/calcination process serves to remove all of the non-carbon elements present in the green foam such as sulfur, oxygen, hydrogen, etc.

Graphitization, commonly involves heating the carbon foam either before or after carbonization at heat-up rate of less than about 10° C. per minute, preferably from about 1° C. to about 5° C. per minute, to a temperature of between about 1700° C. and about 3000° C. in an atmosphere of helium or argon and soaking for a period of less than about one hour. Again, the inert gas may be supplied at a pressure ranging from about 0 psi up to a few atmospheres. According to a preferred embodiment of the process described herein, the abrasive foams of the present invention are produced by sequentially carbonizing and then graphitizing the green foam as described above.

As the invention has been described, it will be apparent to those skilled in the art that the same may be varied in many ways without departing from the spirit and scope of the invention. Any and all such modifications are intended to be included within the scope of the appended claims.

What is claimed is:

1. An abrasive carbon foam having an adherent surface comprising:

an abrasive carbon foam body having a surface, wherein the abrasive carbon foam body is produced by blending particulate coal having a free swell index ranging from about 3.5 to about 5.0 with about 1% to about 10% by volume of a carbide precursor powder to form a reactive blend wherein the carbide precursor is selected from the group consisting of tungsten, silicon, and titanium, and controllably heating said reactive blend in a mold under a non-oxidizing atmosphere to a first temperature ranging from about 300° C. to about 600° C. and soaking at this temperature for a period ranging from about 10 minutes to about 12 hours; and an epoxy-graphite adhesive on the surface of the abrasive carbon foam body.

* * * * *